(12) United States Patent
Tiedemann, Jr. et al.

(10) Patent No.: US 7,986,672 B2
(45) Date of Patent: Jul. 26, 2011

(54) METHOD AND APPARATUS FOR CHANNEL QUALITY FEEDBACK IN A WIRELESS COMMUNICATION

(75) Inventors: Edward G. Tiedemann, Jr., Concord, MA (US); Stein A. Lundby, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1649 days.

(21) Appl. No.: 10/084,019

(22) Filed: Feb. 25, 2002

(65) Prior Publication Data

US 2003/0161285 A1   Aug. 28, 2003

(51) Int. Cl.
H04W 4/00 (2009.01)
H04B 17/00 (2006.01)

(52) U.S. Cl. ........ 370/332; 370/328; 370/330; 370/333; 370/335; 370/341; 370/252; 370/311; 370/345; 370/431; 455/506; 455/452.2; 455/67.13; 455/161.3; 455/522; 375/332; 375/343

(58) Field of Classification Search .......... 370/227–503; 455/69, 522, 506, 562, 452.2, 67.13, 161.3
See application file for complete search history.

(56) References Cited

U.S. PATENT DOCUMENTS

| | | | | |
|---|---|---|---|---|
| 4,633,411 A | * | 12/1986 | Bliss | ................................ 702/77 |
| 5,216,692 A | * | 6/1993 | Ling | ................................ 375/130 |
| 5,297,161 A | * | 3/1994 | Ling | ................................ 375/130 |
| 5,351,274 A | * | 9/1994 | Chennakeshu et al. | ........ 375/347 |
| 5,406,593 A | * | 4/1995 | Chennakeshu et al. | ........ 375/376 |
| 5,465,398 A | | 11/1995 | Flammer | |
| 5,479,447 A | | 12/1995 | Chow et al. | |
| 5,726,978 A | | 3/1998 | Frodigh et al. | |
| 5,862,451 A | * | 1/1999 | Grau et al. | ..................... 725/116 |
| 5,905,742 A | * | 5/1999 | Chennakeshu et al. | ........ 714/792 |
| 5,914,950 A | * | 6/1999 | Tiedemann et al. | ........... 370/348 |
| 5,960,039 A | * | 9/1999 | Martin et al. | .................. 375/267 |
| 6,101,176 A | * | 8/2000 | Honkasalo et al. | ............ 370/335 |
| 6,108,374 A | * | 8/2000 | Balachandran et al. | ....... 375/227 |
| 6,122,514 A | * | 9/2000 | Spaur et al. | .................... 455/448 |
| 6,137,994 A | | 10/2000 | Alterman et al. | |
| 6,154,489 A | * | 11/2000 | Kleider et al. | ................. 375/221 |

(Continued)

FOREIGN PATENT DOCUMENTS

EP  0682419 B1  11/1995

(Continued)

OTHER PUBLICATIONS

International Search Report, PCT/US2003/005364, ISA-EPO, Jul. 16, 2003.

(Continued)

*Primary Examiner* — Ayaz R Sheikh
*Assistant Examiner* — Venkatesh Haliyur
(74) *Attorney, Agent, or Firm* — Won Tae Kim

(57) ABSTRACT

Method and apparatus for providing link quality feedback to a transmitter. In one embodiment, a periodic link quality message is transmitted on a gated channel, while continuous differential indicators are transmitted. Between quality messages, the differential indicators track the quality of the link. In one embodiment, a parity check is provided with the quality message. In another embodiment, the frequency of transmission for the quality messages is determined by the channel quality. When the receiver anticipates reception of a transmission, the quality messages are generated; else the quality messages are halted.

24 Claims, 10 Drawing Sheets

U.S. PATENT DOCUMENTS

| | | | |
|---|---|---|---|
| 6,160,791 A * | 12/2000 | Bohnke | 370/208 |
| 6,167,031 A | 12/2000 | Olofsson et al. | |
| 6,208,632 B1 * | 3/2001 | Kowalski et al. | 370/335 |
| 6,285,886 B1 * | 9/2001 | Kamel et al. | 455/522 |
| 6,330,456 B1 | 12/2001 | Hashem et al. | |
| 6,385,462 B1 | 5/2002 | Baum et al. | |
| 6,421,527 B1 * | 7/2002 | DeMartin et al. | 455/67.13 |
| 6,427,219 B1 * | 7/2002 | Yang | 714/758 |
| 6,434,366 B1 * | 8/2002 | Harrison et al. | 455/69 |
| 6,445,916 B1 * | 9/2002 | Rahman | 455/423 |
| 6,452,914 B2 * | 9/2002 | Niemela | 370/337 |
| 6,456,598 B1 | 9/2002 | Le Strat et al. | |
| 6,463,295 B1 * | 10/2002 | Yun | 455/522 |
| 6,496,492 B1 | 12/2002 | Zeng | |
| 6,516,192 B1 * | 2/2003 | Spaur et al. | 455/450 |
| 6,535,497 B1 * | 3/2003 | Raith | 370/336 |
| 6,574,211 B2 | 6/2003 | Padovani et al. | |
| 6,584,161 B2 * | 6/2003 | Hottinen et al. | 375/299 |
| 6,597,923 B1 * | 7/2003 | Vanghi et al. | 455/522 |
| 6,741,862 B2 | 5/2004 | Chung et al. | |
| 6,751,187 B2 * | 6/2004 | Walton et al. | 370/210 |
| 6,763,244 B2 * | 7/2004 | Chen et al. | 455/522 |
| 6,856,812 B1 * | 2/2005 | Budka et al. | 455/522 |
| 6,859,446 B1 * | 2/2005 | Gopalakrishnan et al. | 370/335 |
| 6,865,393 B1 * | 3/2005 | Baum et al. | 455/452.2 |
| 6,877,043 B2 * | 4/2005 | Mallory et al. | 709/251 |
| 6,882,634 B2 * | 4/2005 | Bagchi et al. | 370/338 |
| 6,888,844 B2 * | 5/2005 | Mallory et al. | 370/466 |
| 6,891,881 B2 * | 5/2005 | Trachewsky et al. | 375/143 |
| 6,892,059 B1 * | 5/2005 | Kim et al. | 455/272 |
| 6,898,204 B2 * | 5/2005 | Trachewsky et al. | 370/466 |
| 6,947,475 B2 * | 9/2005 | Sendonaris et al. | 375/148 |
| 6,954,800 B2 * | 10/2005 | Mallory | 709/240 |
| 6,975,655 B2 * | 12/2005 | Fischer et al. | 370/516 |
| 6,985,453 B2 * | 1/2006 | Lundby et al. | 370/311 |
| 6,988,236 B2 * | 1/2006 | Ptasinski et al. | 714/758 |
| 6,993,101 B2 * | 1/2006 | Trachewsky et al. | 375/343 |
| 7,000,031 B2 * | 2/2006 | Fischer et al. | 709/248 |
| 7,020,110 B2 * | 3/2006 | Walton et al. | 370/334 |
| 7,035,285 B2 * | 4/2006 | Holloway et al. | 370/474 |
| 7,042,957 B1 * | 5/2006 | Zirwas | 375/295 |
| 7,050,759 B2 * | 5/2006 | Gaal et al. | 455/67.13 |
| 7,143,320 B2 * | 11/2006 | Cavin | 714/704 |
| 7,245,598 B2 * | 7/2007 | Puig-Oses et al. | 370/334 |
| 7,388,853 B2 * | 6/2008 | Ptasinski et al. | 370/338 |
| 7,406,106 B2 * | 7/2008 | Mallory | 370/522 |
| 2001/0028685 A1 | 10/2001 | Sydon et al. | |
| 2001/0055311 A1 * | 12/2001 | Trachewsky et al. | 370/445 |
| 2002/0006136 A1 * | 1/2002 | Mallory et al. | 370/466 |
| 2002/0009156 A1 * | 1/2002 | Hottinen et al. | 375/267 |
| 2002/0012343 A1 * | 1/2002 | Holloway et al. | 370/389 |
| 2002/0016177 A1 | 2/2002 | Miya et al. | |
| 2002/0026523 A1 * | 2/2002 | Mallory et al. | 709/236 |
| 2002/0027886 A1 * | 3/2002 | Fischer et al. | 370/255 |
| 2002/0041570 A1 * | 4/2002 | Ptasinski et al. | 370/252 |
| 2002/0042836 A1 * | 4/2002 | Mallory | 709/232 |
| 2002/0044531 A1 * | 4/2002 | Cooper et al. | 370/248 |
| 2002/0046382 A1 * | 4/2002 | Yang | 714/758 |
| 2002/0057713 A1 * | 5/2002 | Bagchi et al. | 370/468 |
| 2002/0057717 A1 * | 5/2002 | Mallory | 370/503 |
| 2002/0080886 A1 * | 6/2002 | Ptasinski et al. | 375/295 |
| 2002/0101839 A1 * | 8/2002 | Farley et al. | 370/329 |
| 2002/0105923 A1 * | 8/2002 | Nikides et al. | 370/329 |
| 2002/0110088 A1 * | 8/2002 | Lundby et al. | 370/252 |
| 2002/0131441 A1 * | 9/2002 | Trachewsky et al. | 370/441 |
| 2002/0150065 A1 * | 10/2002 | Ponnekanti | 370/334 |
| 2002/0163932 A1 * | 11/2002 | Fischer et al. | 370/465 |
| 2002/0183064 A1 * | 12/2002 | Gopalakrishnan et al. | 455/452 |
| 2003/0002518 A1 * | 1/2003 | Shibutani | 370/442 |
| 2003/0012217 A1 * | 1/2003 | Andersson et al. | 370/437 |
| 2003/0043732 A1 * | 3/2003 | Walton et al. | 370/208 |
| 2003/0072395 A1 * | 4/2003 | Jia et al. | 375/341 |
| 2003/0099209 A1 | 5/2003 | Laakso et al. | |
| 2003/0125040 A1 * | 7/2003 | Walton et al. | 455/454 |
| 2003/0128658 A1 * | 7/2003 | Walton et al. | 370/208 |
| 2003/0157900 A1 * | 8/2003 | Gaal et al. | 455/69 |
| 2003/0161285 A1 * | 8/2003 | Tiedemann et al. | 370/332 |
| 2003/0171118 A1 * | 9/2003 | Miya | 455/442 |
| 2003/0206559 A1 * | 11/2003 | Trachewsky et al. | 370/509 |
| 2004/0013103 A1 * | 1/2004 | Zhang et al. | 370/345 |
| 2008/0130613 A1 * | 6/2008 | Tiedemann et al. | 370/342 |

FOREIGN PATENT DOCUMENTS

| | | |
|---|---|---|
| EP | 0964540 | 12/1999 |
| EP | 1360778 | 6/2007 |
| EP | 1801997 A2 * | 6/2007 |
| GB | 2326063 A | 12/1998 |
| JP | 2000078639 A | 3/2000 |
| JP | 2001522211 A | 11/2001 |
| JP | 2002009692 | 1/2002 |
| JP | 2007189711 A * | 7/2007 |
| JP | 2009060592 A * | 3/2009 |
| RU | SU1524188 A | 11/1989 |
| WO | 95/24773 | 9/1995 |
| WO | 9923844 A1 | 5/1999 |
| WO | 0115355 A1 | 3/2001 |
| WO | 0119100 A1 | 3/2001 |
| WO | 02067461 | 8/2002 |

OTHER PUBLICATIONS

European Search Report, EP07003328, EPO, The Hague, Sep. 27, 2007.

International Search Report, PCT/US02/02142, ISA-EPO Jun. 13, 2002.

3GPP2 C.S0024 v. 3.0: CDMA2000 High Rate Packet Data Air Interface Specification (Dec. 2001).

* cited by examiner

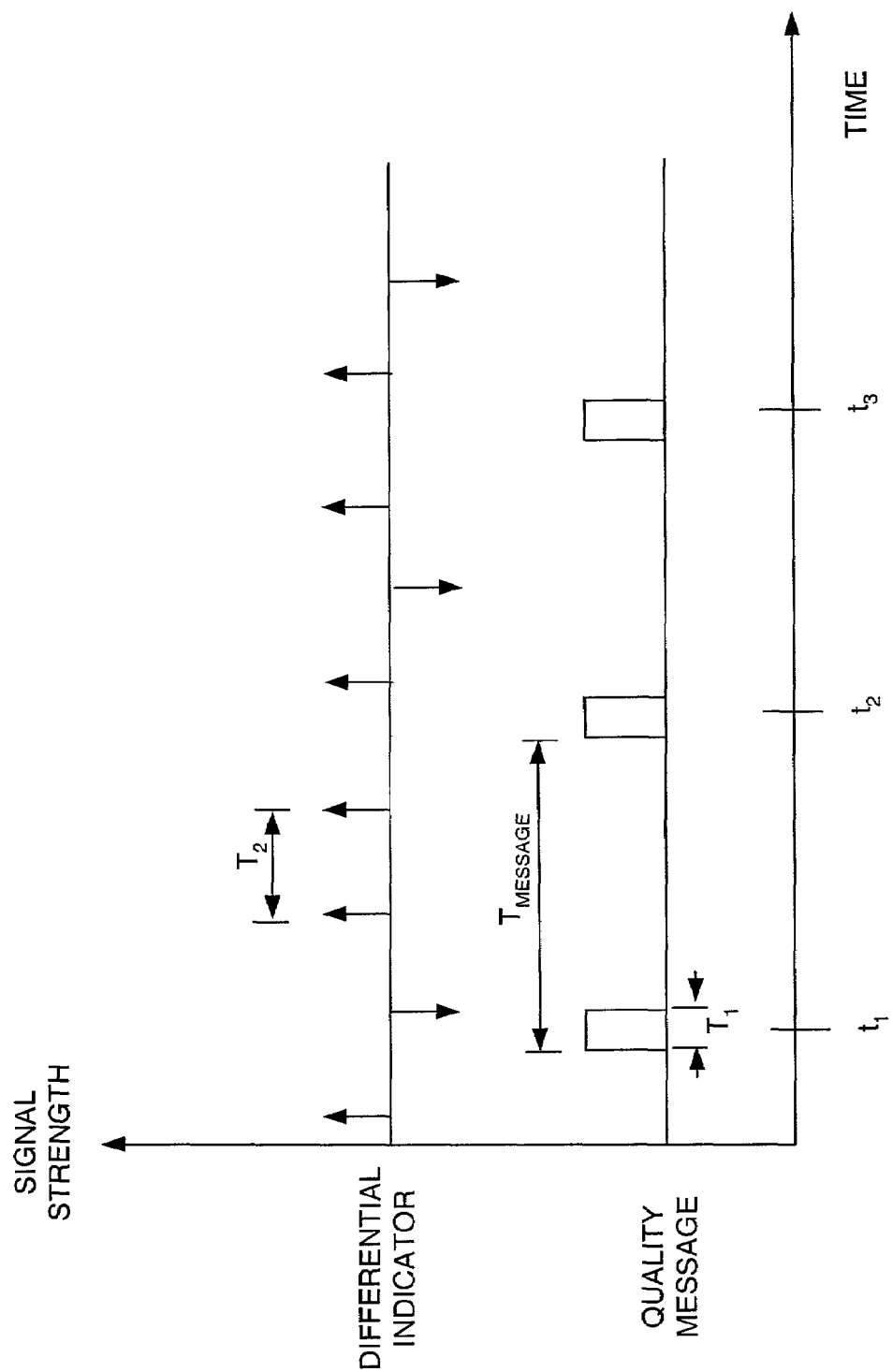

METHOD AND APPARATUS FOR CHANNEL QUALITY FEEDBACK IN A WIRELESS COMMUNICATION

BACKGROUND

1. Field

The present method and apparatus relate generally to communication, and more specifically to providing channel quality feedback in a wireless communication system.

2. Background

Increasing demand for wireless data transmission and the expansion of services available via wireless communication technology have led to the development of systems capable of handling voice and data services. One spread spectrum system designed to handle the various requirements of these two services is a Code Division Multiple Access, CDMA, system referred to as cdma2000, which is specified in "TIA/EIA/IS-2000 Standards for cdma2000 Spread Spectrum Systems." Enhancements to cdma2000 as well as alternate types of voice and data systems are also in development.

As the amount of data transmitted and the number of transmissions increase, the limited bandwidth available for radio transmissions becomes a critical resource. There is a need, therefore, for an efficient and accurate method of transmitting information in a communication system that optimizes use of available bandwidth.

SUMMARY

Embodiments disclosed herein address the above stated needs by providing a remote station apparatus having a quality measurement unit for iteratively measuring link quality of a communication link, and a differential analyzer for determining changes in the measured link quality. By providing a method of reducing the transmission of feedback information used for power control and/or scheduling of data transmissions in wireless communication systems, the present invention provides a flexible method of efficient allocation of transmission resources.

BRIEF DESCRIPTION OF THE DRAWINGS

FIG. 3D is a timing diagram illustrating link quality feedback in a wireless system;

DETAILED DESCRIPTION

Figure 1:
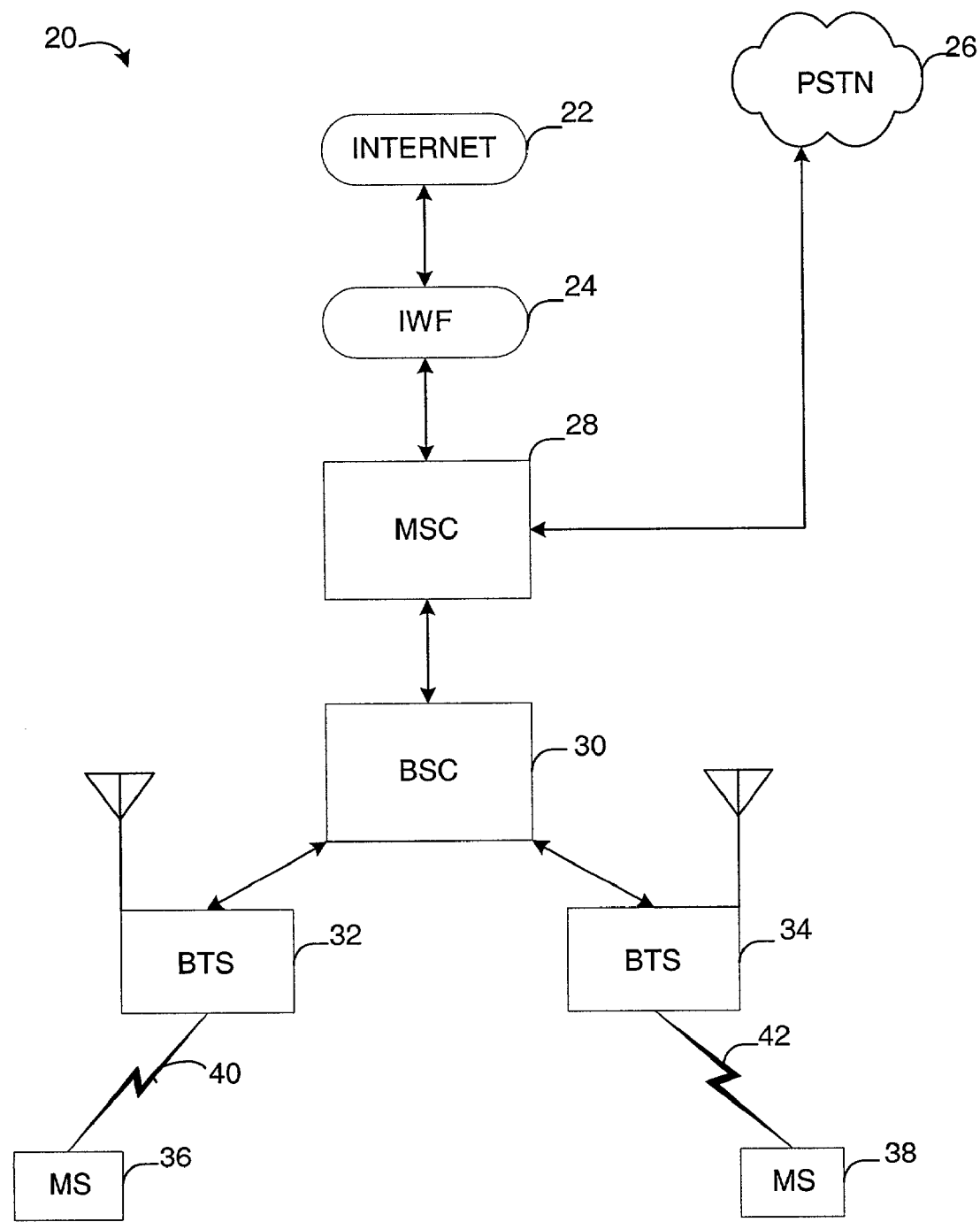
FIG. 1 is a diagram of a wireless communication system.

The word "exemplary" is used exclusively herein to mean "serving as an example, instance, or illustration." Any embodiment described herein as "exemplary" is not necessarily to be construed as preferred or advantageous over other embodiments.

In a spread-spectrum wireless communication system, such as a cdma2000 system, multiple users transmit to a transceiver, often a base station, in the same bandwidth at the same time. The base station may be any data device that communicates through a wireless channel or through a wired channel, for example using fiber optic or coaxial cables. A user may be any of a variety of mobile and/or stationary devices including but not limited to a PC card, a compact flash, an external or internal modem, or a wireless or a wireline phone. A user is also referred to as a remote station. Note that alternate spread-spectrum systems include systems: packet-switched data services; Wideband-CDMA, W-CDMA, systems, such as specified by Third Generation Partnership Project, 3GPP; voice and data systems, such as specified by Third Generation Partnership Project Two, 3GPP2.

The communication link through which the user transmits signals to the transceiver is called a Reverse Link, RL. The communication link through which a transceiver sends signals to a user is called a Forward Link, FL. As each user transmits to and receives from the base station, other users are concurrently communicating with the base station. Each user's transmissions on the FL and/or the RL introduces interference to other users. To overcome interference in the received signals, a demodulator seeks to maintain a sufficient ratio of bit energy to interference power spectral density, $E_b/N_0$, in order to demodulate the signal at an acceptable probability of error. Power Control, PC, is a process that adjusts the transmitter power of one or both of the Forward Link, FL, and the Reverse Link, RL, to satisfy a given error criteria. Ideally, the power control process adjusts the transmitter power(s) to achieve at least the minimum required $E_b/N_0$ at the designated receiver. Still further, it is desirable that no transmitter uses more than the minimum $E_b/N_0$. This ensures that any benefit to one user achieved through the power control process is not at the unnecessary expense of any other user.

Power control impacts the capacity of the system by ensuring that each transmitter only introduces a minimal amount of interference to other users and thus increases processing gain. Processing gain is the ratio of the transmission bandwidth, W, to the data rate, R. The ratio of $E_b/N_0$ to W/R corresponds to the Signal-to-Noise Ratio, SNR. Processing gain overcomes a finite amount of interference from other users, i.e., total noise. System capacity is, therefore, proportional to processing gain and SNR. For data, feedback information is provided from the receiver to the transmitter as a link quality measure. The feedback ideally is of fast transmission with low latency.

Power control allows the system to adapt to changing conditions within an environment, including but not limited to the geographical conditions and mobile velocity. As the changing conditions impact the quality of a communication link, the transmission parameters adjust to accommodate the changes. This process is referred to as link adaptation. It is desirable for link adaptation to track the condition(s) of the system as accurately and quickly as possible.

According to one embodiment, link adaptation is controlled by the quality of a communication link, wherein the SNR of the link provides a quality metric for evaluating the link. The SNR of the link may be measured as a function of Carrier-to-Interference, C/I, at the receiver. For voice communications, the quality metric C/I may be used for providing power control commands instructing the transmitter to either increase or decrease power. For packet data communications, such as an HDR system as specified in "TIA-856 cdma2000 High Rate Packet Data Air Interface Specification," 3GPP, and 3GPP2 data communications are scheduled among multiple users, where at any given time, only one user receives data from the access network or base station. In a packet-switched data system, the quality metric measurement, such as SNR and/or C/I, may provide valuable information to the base station or access network transmitter in determining proper data rate, encoding, modulation and scheduling of data communications. Therefore, it is beneficial to provide the quality metric efficiently from the remote station to the base station.

One disadvantage associated with the feedback of channel quality information is the increased transmission loading on the reverse link (or other link on which the feedback is provided). For example, the quality feedback information on the reverse link may result in reverse link loading that is approximately equal to a voice call, as the feedback information may use as much power as a voice call.

The quality feedback message is determined by the requirements of a given system. For example, in a voice transmission system, referred to as a low-latency system, the quality message may be the measured C/I and/or a function thereof; whereas, in an HDR system, or other data transmission system, the quality message may be a Data Rate Control (DRC) indicator, wherein the DRC is provided on the reverse link as a request for a specific transmission data rate. In one embodiment, the quality message is a 5-bit indicator that is sent 800 times per second resulting in a 4000 bps rate. The total load on the reverse link for sending the 5-bit indicator is approximately that of the voice traffic channel. While the direct transmission of a quality message, such as C/I or DRC, incurs higher loading, the quality message is desirable as it provides an accurate monitor of the channel condition. Each quality message is independent and allows the transmitter to make transmission decisions without relying on historical information.

In a cdma2000 type system, the receiver provides a per slot power control mechanism that effectively provides a channel quality indicator, such as the C/I value. The per slot power control mechanism is adjusted in response to the power actually transmitted on the traffic channel. The power control mechanism is typically a one bit indicator referred to as the power control bit; in one embodiment, a high polarity power control bit corresponds to an "increase power" instruction, and a low polarity power control bit corresponds to a "decrease power" instruction. If there is a bit error in the power control mechanism, the traffic channel power will be incorrect. In other words, the transmit power for the link will be adjusted in the wrong direction, resulting in either too much or too little transmit power. In cdma2000, quality information may be derived from the power control bits. For example, when the transmit power is adjusted to a desired operating point, the power control bit values are expected to alternate on successive slots, i.e., up, down, up, down, etc. If, for example, there is a decode error in reverse link, then the MS measures SNR and sends an incorrect command. The response to that incorrect command will tend to degrade the quality of the link, and therefore the next correct power control command should correct for the previous command received in error.

The present invention enhances the use of a quality message for providing channel quality information from the receiver to transmitter. The term quality message encompasses both a direct transmission of a quality indicator, such as a C/I value, and also, an indirect indicator, such as the power control mechanism discussed hereinabove. The quality message is selected and dynamically adjusted according to the requirements and/or operation of a given system.

According to a first aspect, the quality message may be sent periodically to reduce the reverse link loading. In one embodiment, the receiver periodically transmits the quality message, e.g., an explicit 5-bit C/I measurement. The periodic transmission is provided during designated slots. During other slots when the quality message is not transmitted, the receiver may send a differential indicator. The differential indicator is a shorter message used to identify changes in the quality message. The differential indicator may be a 1 bit/slot indicator, but in general is transmitted several times between each quality message transmission. According to one embodiment, along with the quality message, such as the 5-bit C/I feedback, the receiver also transmits the 1 bit/slot up-down power control bit, i.e., during every slot, including the slot transmitting the quality message. The provision of both the quality message and the differential indicator provides the transmitter with frequently updated channel condition information.

According to another embodiment, the power control mechanism is not used, and therefore, the bit/slot allocated for the power control bit is used to transmit the differential indicator. In an alternate embodiment, the bit/slot allocated for the power control bit is used as a parity check bit for the quality message, allowing the transmitter to better determine whether the quality message is in error.

Still another aspect provides a system wherein the receiver transmits the quality message on anticipation of data reception. The receiver anticipates when the transmitter will send data and adjusts the rate for transmission of the quality messages. For example, the receiver may estimate the variation in C/I over a given time window. If the current C/I is above a predetermined threshold, the receiver sends the explicit C/I more frequently. If the current C/I is below the threshold, the receiver sends the quality message less frequently.

One embodiment of a wireless communication system providing quality messages from a receiver to a transmitter is described with respect to FIG. 1, wherein FIG. 1 illustrates a wireless communication system 20. The system 20 is a spread spectrum CDMA system capable of voice and data transmissions. System 20 includes two segments: a wired subsystem and a wireless subsystem. The wired subsystem is the Public Switched Telephone Network, PSTN 26, and the Internet 22. The Internet 22 portion of the wired subsystem interfaces with the wireless subsystem via Inter-Working Function Internet, IWF 24. The ever-increasing demand for data communications is typically associated with the Internet and the ease of access to the data available thereby. However, advancing video and audio applications increase the demand for transmission bandwidth.

The wired subsystem may include but is not limited to other modules such as an instrumentation unit, a video unit, etc. The wireless subsystem includes the base station subsystem, which involves the Mobile Switching Center, MSC 28, the Base Station Controller, BSC 30, the Base Transceiver Station(s), BTS(s) 32, 34, and the Mobile Station(s), MS(s) 36, 38. The MSC 28 is the interface between the wireless subsystem and the wired subsystem. It is a switch that talks to a variety of wireless apparatus. The BSC 30 is the control and management system for one or more BTS(s) 32, 34. The BSC 30 exchanges messages with the BTS(s) 32, 34 and the MSC 28. Each of the BTS(s) 32, 34 consist of one or more transceivers placed at a single location. Each of the BTS(s) 32, 34 terminates the radio path on the network side. The BTS(s) 32, 34 may be in co-located with BSC 30 or may be independently located.

The system 20 includes radio air interface physical channels 40, 42 between the BTS(s) 32, 34 and the MS(s) 36, 38. The physical channels 40, 42 are communication paths described in terms of the digital coding and RF characteristics.

As discussed herein above, a FL is defined as a communication link for transmissions from one of the BTS(s) 32, 34 to one of the MS(s) 36, 38. An RL is defined as a communication link for transmissions from one of the MS(s) 36, 38 to one of the BTS(s) 32, 34. According to one embodiment, power control within system 20 includes controlling transmit power for both the RL and the FL. Multiple power control mechanisms may be applied to the FL and RL in system 20, including reverse open loop power control, reverse closed loop power control, forward closed loop power control, etc. Reverse open loop power control adjusts the initial access channel transmission power of MS(s) 36, 38, and compensates for variations in path loss attenuation of the RL. The RL uses two types of code channels: traffic channel(s), and access channel(s).

Figure 2:
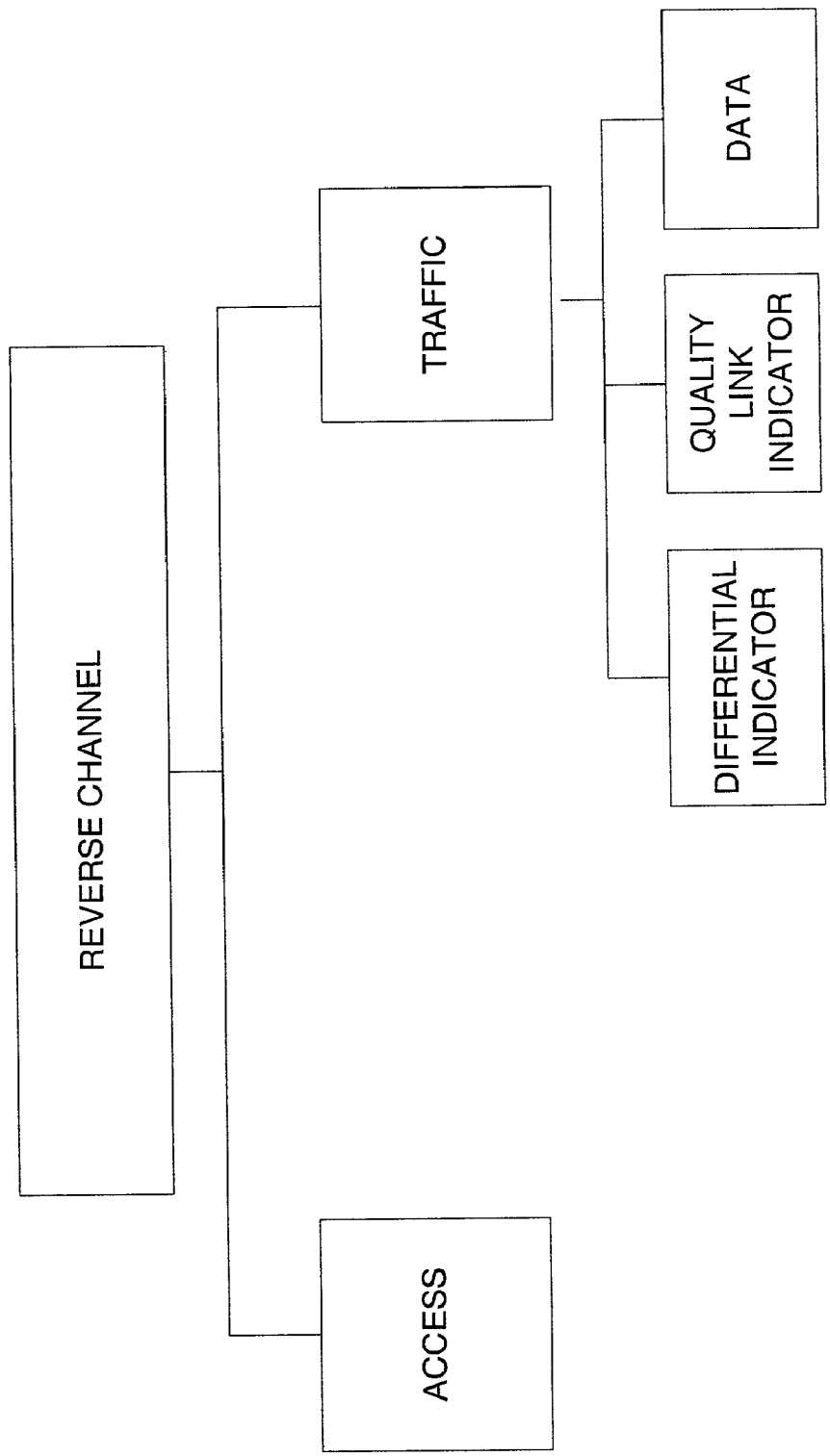
FIG. 2 is a diagram of a reverse channel architecture in a wireless communication system.

FIG. 2 illustrates the architecture of a RL of system 20 of FIG. 1 according to one embodiment. The RL or reverse channel is composed of two types of logical channels: access and traffic. Each logical channel is a communication path within the protocol layers of either the BTS(s) 32, 34 or the MS(s) 36, 38. Information is grouped onto a logical channel based upon criteria such as the number of users, the transmission type, the direction of the transfer, etc. The information on a logical channel is ultimately carried on one or more physical channels. Mappings are defined between logical and physical channels. These mappings may be permanent or may be defined only for the duration of a given communication.

Note that for data services a remote station may be referred to as an Access Terminal, AT, wherein an AT is a device providing data connectivity to a user. An AT may be connected to a computing device, such as a laptop personal computer, or it may be a self-contained data device, such as a personal digital assistant. Further, the base station may be referred to as an Access Network, AN, wherein the AN is network equipment providing data connectivity between a packet switched data network, such as the Internet, and at least one AT. The reverse access channel is used by ATs to communicate with the AN when no traffic channel is assigned.

Continuing with FIG. 2, the traffic channel is composed of three logical channels: differential indicator; link quality indicator; and data. The link quality indicator provides a measure of the quality of the FL pilot channel. One embodiment uses Carrier-to-Interference, C/I, as a link quality metric, wherein the remote station measures the C/I of the FL pilot channel for multiple instances having a predetermined period. The link quality indicator is encoded for periodic transmission to the base station on the RL. The encoding may include the application of a cover, wherein the specific cover applied corresponds to the sector of the measured pilot signal. The encoded link quality indicator is referred to as a "quality message." Alternate embodiments may implement other means of determining a link quality indicator and may implement other metrics corresponding to link quality. Additionally, the quality metric measurements may be applied to other received signals. The C/I measurement is often expressed in dB units.

In the exemplary embodiment, the link quality message is determined and transmitted periodically, which reduces any impact on available bandwidth on the RL and also avoids degradation on the FL. For example, in one embodiment the link quality message is transmitted once every 20 msec. In addition, a differential indicator is transmitted to the base station on the RL when the link quality indicator is not transmitted. In one embodiment the differential indicator is sent every 1.25 msec. As illustrated in FIG. 2, the traffic channel further includes the differential indicator sub-channel. In contrast to the link quality indicator and quality message, the differential indicator is an indication of relative changes in the quality of the FL pilot channel, which is sent much more frequently. To determine the differential indicator, incremental comparisons are made of to a last projected C/I measurement of the FL pilot signal. The result of the comparison is transmitted as a bit or bits indicating the direction of the change. For example, according to one embodiment, the MS keeps an estimate of the C/I value decoded by the BTS. When the C/I measure is below this value, the differential indicator is positive; and if the C/I measure is above this value, the differential indicator is negative. An alternate threshold may be applied for determining the value of the differential indicator. The threshold may be dynamically adjusted in response to the result of the comparison. The differential indicator is transmitted with little or no coding, and therefore provides a fast, efficient, low latency feedback method. The differential indicator effectively provides continuous fast feedback to the base station regarding the state of the FL. The feedback is sent via the RL. Note that in contrast to power control commands which typically have an opposite polarity to the C/I measurement, the quality message and the differential indicator track the C/I measurement.

The use of a differential indicator eliminates the need to frequently or continuously transmit the entire C/I, wherein the differential indicator provides incremental comparisons to the last projected value. The differential indicator according to one embodiment is an UP (+1 dB) or DOWN (−1 dB) indicator. According to an alternate embodiment, successive steps in a same direction have increasing values, such as first UP (+1 dB), second UP (+2 dB), etc. In yet another embodiment the differential indicator includes multiple bits, wherein the bits have significance to identify the direction and amount of change. Since the fading channel is a continuous process, the C/I will be a continuous process and can therefore be tracked with such a differential signaling technique. Since this differential message is much smaller than the full C/I message, not only does it take less time to encode, to transmit, and to decode, but it also takes up less energy on the reverse link. This means that not only is the FL performance improved, but the RL loading is also reduced. The periodic transmission of a quality message prevents and/or corrects synchronization problems between the base station and remote station. For example, consider a remote station having an initial quality message corresponding to 0 dB C/I measurement. The remote station continuously measures the link quality and proceeds to transmit three differential indicators, each corresponding to 1 dB increments. Thus, the remote station has calculated a projected C/I of 3 dB. The base station may decode two of the differential indicators correctly, and have a decode error on a third. The base station has, therefore, calculated a projected C/I of 2 dB. At this point, the remote station and the base station are out of synchronization. The next transmission of the encoded quality message is transmitted in a reliable manner and will correct the synchronization disparity. In this way, the quality message re-synchronizes the base station and the remote station. In one embodiment the quality message is encoded using a very powerful (5, 24) block code, interleaved, and transmitted over 20 ms. Note that the quality message is used to correct any synchronization errors that could have occurred in feeding back the differential indicators, and therefore, the quality message may tolerate relatively larger latencies, such as 20 ms.

The differential indicator is applicable in wireless communication systems using fast link adaptation techniques that require the receiver to constantly feedback the latest channel state to the transmitter. While the differential indicator is also applicable for feedback on FL of the RL channel state, in data services, link adaptation typically occurs on the forward link, and therefore the exemplary embodiment illustrates a remote station feeding information to the base station about the state of the FL using differential indicators on the RL. Ideally, link quality feedback occurs frequently with minimum delay to maximize FL system performance. The use of a differential indicator reduces loading on the RL, thereby increasing the capacity of the RL available for data traffic.

Figure 3A:
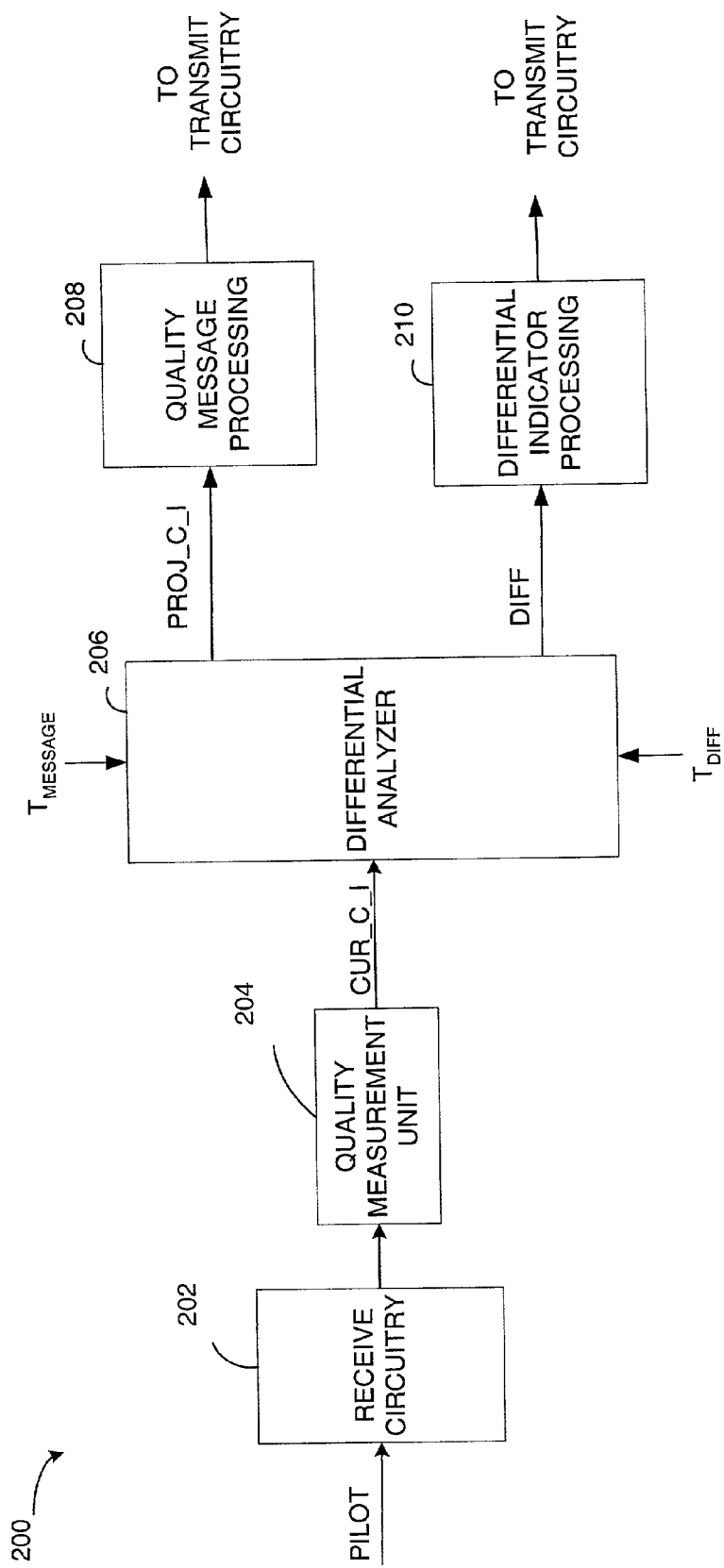
FIG. 3A is a diagram of a remote station in a wireless communication system.

A portion of a remote station 200 for use in the system 20 is illustrated in FIG. 3A. The remote station 200 includes receive circuitry 202 that includes but is not limited to an antenna(s), and pre-processing filtering. The receive circuitry 202 processes signals received at the remote station 200 on the FL, including but not limited to the pilot signal. The receive circuitry 202 is coupled to quality measurement unit 204 that determines the quality metric measurement of the pilot signal. In the exemplary embodiment, the quality measurement unit 204 measures the C/I of the received FL pilot signal. The quality metric measurement, cur_C_I, is provided to differential analyzer 206. The differential analyzer 206 is responsive to a predetermined quality message period, $T_{MESSAGE}$. Within each quality message period, the differential analyzer 206 provides one projected C/I measurement, proj_C_I, as a link quality indicator for further processing to form the quality message. The further processing includes encoding the link quality indicator, including application of a cover identifying the transmission sector of the measured pilot signal. For the remainder of the period, the quality measurement unit 204 provides successive C/I measurements to the differential analyzer 206.

Continuing with FIG. 3A, during each time period $T_{MESSAGE}$ the quality message is generated once and multiple differential indicators are generated, wherein each generated differential indicator is referred to as "diff." Note that the quality message and the differential indicator are generated at different rates. As illustrated in FIG. 3A, the differential analyzer 206 also receives an input signal, $T_{DIFF}$, controlling the rate of differential indicator generation. The projected C/I is provided to a quality message processing unit 208, wherein the quality message is generated based on the projected C/I. Similarly, the differential indicator is provided to a differential indicator processing unit 210. Both the quality message processing unit 208 and the differential indicator processing unit 210 prepare the information for transmission to a transmitter (not shown). The outputs of the quality message processing unit 208 and differential indicator processing unit 210 are provided to transmit circuitry (not shown).

Figure 3B:
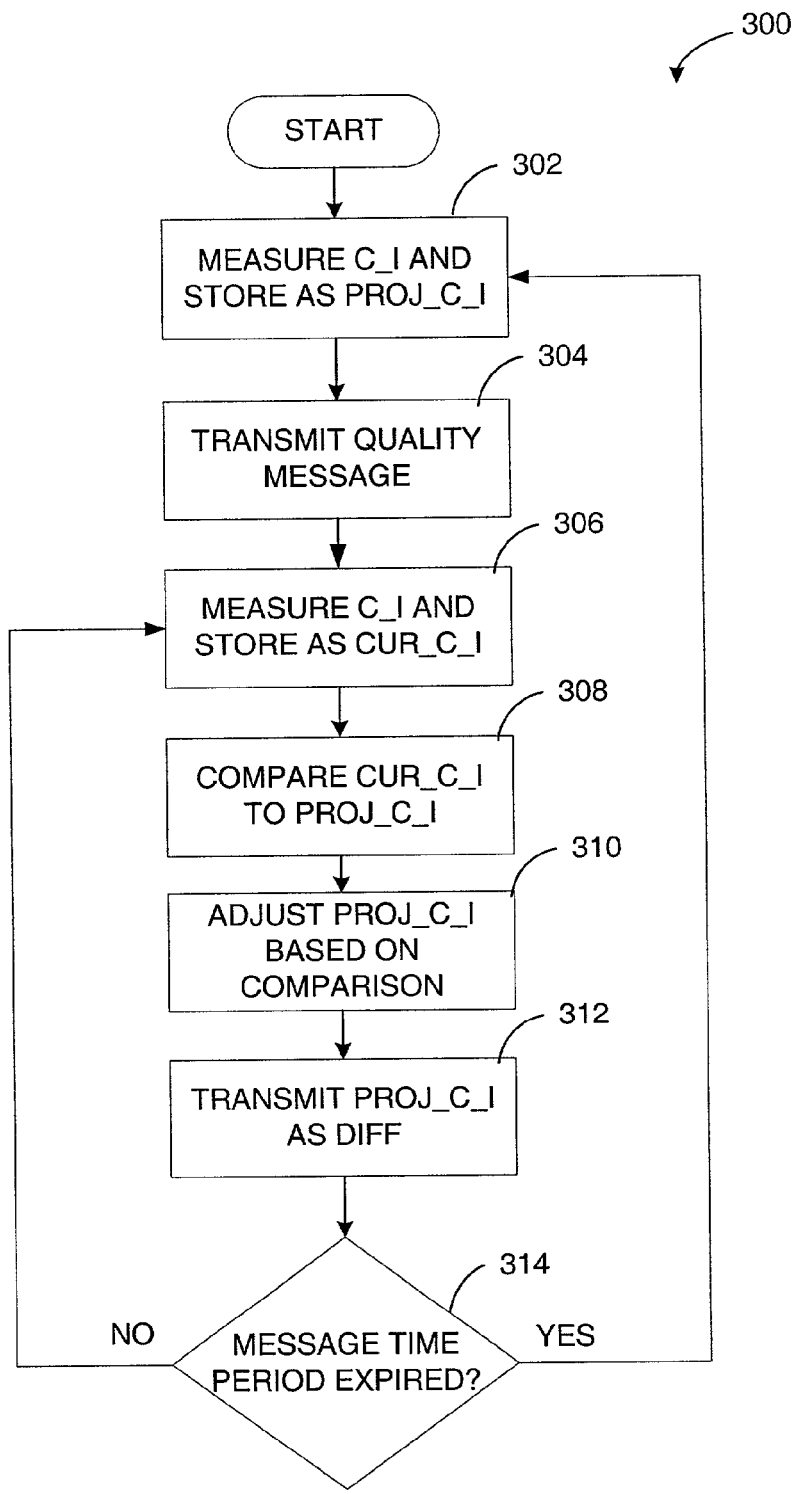
FIG. 3B is a flow diagram of a method for generating link quality feedback from a remote station in a wireless system.

Operation of the differential analyzer 206 in a remote station according to one embodiment is detailed in FIG. 3B. According to one embodiment illustrated in FIG. 3B, in a remote station, the differential analyzer 206 process starts by receiving a C/I measurement from the quality measurement unit 204, wherein the cur_C_I is a link quality measure of a received signal. The process also stores the cur_C_I value as a projected measurement in a variable "proj_C_I" at step 302. Step 302 is an initialization step and is performed only once per session. At this point no historical C/I measurements are available for a comparison.

At step 304 the proj_C_I value is transmitted as the quality message. At step 306 the C/I is measured and stored as a current measurement in a variable "cur_C_I" to be used for incremental differential comparisons. At step 308 the differential analyzer 206 compares cur_C_I to proj_C_I and generates DIFF accordingly. Additionally, the variable proj_C_I is adjusted in accordance with the comparison at step 310. The adjustment tracks changes in the link quality and, therefore, if cur_C_I is greater than proj_C_I, the value proj_C_I is increased and vice versa. The differential indicator, DIFF, is transmitted at step 312, wherein DIFF has been determined by the comparison of cur_C_I and proj_C_I. Note that DIFF provides an indication of the direction of change in link quality. In one embodiment DIFF is a single bit, wherein a positive value corresponds to an increase and a negative value corresponds to a decrease. Alternate polarity schemes may be implemented as well as multiple bits to represent DIFF, which provides an indication of the amount of change in addition to the direction of the change.

At step 314, the process determines if the quality message time period has expired. Within each quality message time period one quality message is transmitted, while multiple differential indicators are transmitted. On expiration of the quality message time period, the process returns to step 302. Until expiration of the quality message time period, the process returns to step 306. In this way, the remote station provides a quality message with the full projected C/I information, i.e., proj_C_I, and successive differential indicators to track changes to the projected C/I. Note that in one embodiment, each differential indicator is assumed to correspond to a predetermined step size. In an alternate embodiment the differential indicator is assumed to correspond to one of several predetermined step sizes. In another embodiment the amplitude of the differential indicator determines the step size. In another embodiment the differential indicator includes multiple information bits, wherein the bits have significance to select the direction and amplitude of the step size among a set of predetermined step sizes. In yet another alternate embodiment, the step size may change dynamically.

Figure 3C:
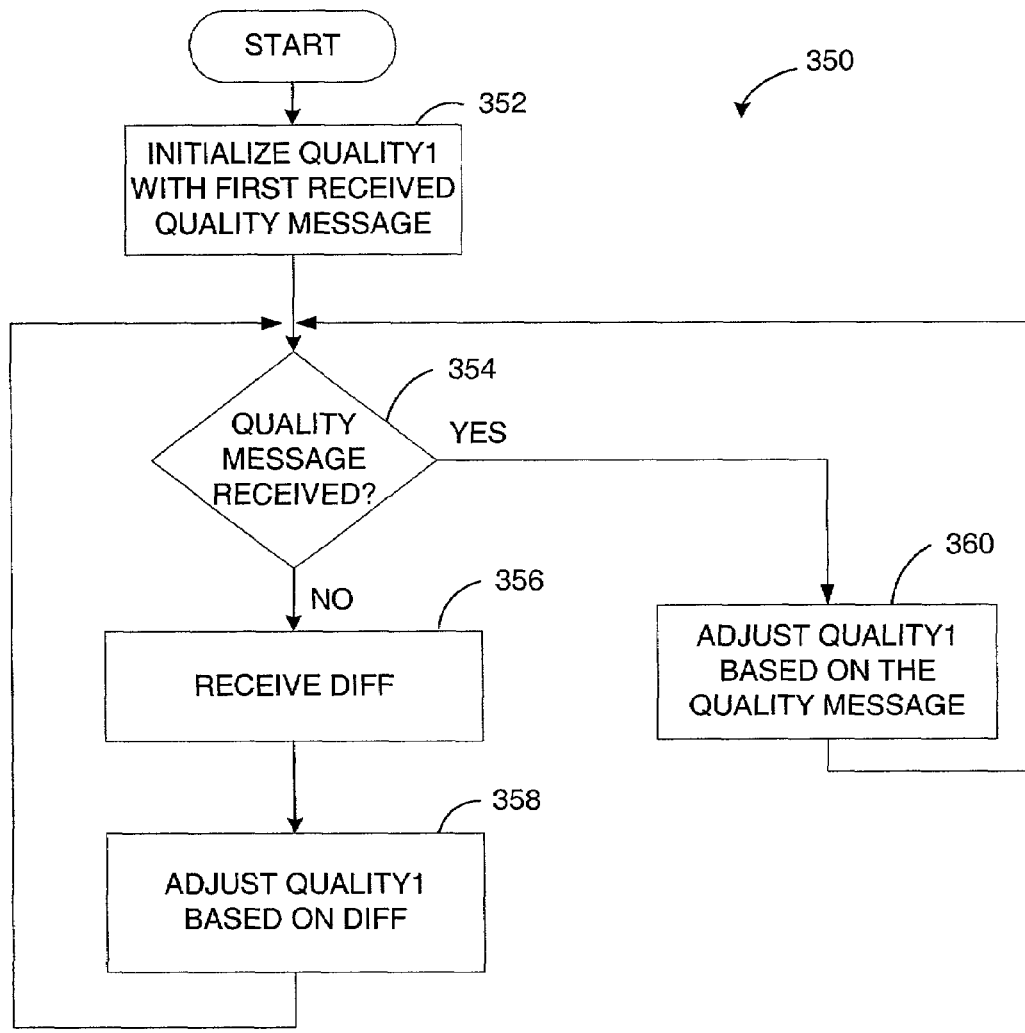
FIG. 3C is a flow diagram of a method for processing link quality feedback at a base station in a wireless system.

FIG. 3C illustrates a method 350 for processing quality messages and differential indicators at a base station. A variable "QUALITY1" is initialized to a default value at step 352 with the first received quality message. The default value may be based on an initially received quality message. The process then determines if a quality message is received at step 354. On receipt of a quality message, QUALITY1 is updated based on the quality message received at step 360. The process then returns to step 354. When no quality message has been received and a DIFF is received at step 356, the process continues to step 358 where QUALITY1 is adjusted based on DIFF. The process then returns to step 354.

According to one embodiment, the quality message is transmitted on a gated channel, wherein transmissions are made once each time period $T_{message}$. Differential indicators are transmitted at a higher frequency on a continuous channel. A diagram of the signal strength of quality messages and the differential indicators are plotted as a function of time, as illustrated in FIG. 3D. The quality messages are transmitted at times $t_1$, $t_2$, $t_3$, etc., wherein no quality messages are transmitted at other times within each period $T_{message}$. The differential indicators are transmitted continuously. In the exemplary embodiment, the quality message is transmitted for predetermined time duration $T_1$. The differential indicators are separated by time duration $T_2$. Ideally $T_2$ is greater than $T_1$, wherein no differential indicator is transmitted within the time duration $T_1$ for transmission of the quality message. In this way, the base station does not receive a differential indicator and a quality message at a same given time. In practice, if a differential indicator overlaps a quality message in time, the base station uses the quality message.

The quality messages and the differential indicators provide feedback to the base station. While FIG. 3D illustrates distinct and separate occurrences of quality messages and differential indicators, the quality message may be sent over a longer time period creating overlap between transmissions.

In one embodiment, the quality message may be encoded and transmitted, wherein the C/I messages are processed very slowly. The quality message would then be received and decoded at the base station much later. The base station effectively pipelines the differential indicators and is able to back out of a calculation path and return to find the projected measurement at the time when the message was encoded and transmitted by the remote station. If the base station finds that the quality message shows an incorrect calculation, i.e., result after application of differential indicators, the result is adjusted according to the quality message. For example, where the projected measurement was off by +2 dB, then the current projected measurement could be increased by 2 dB.

Figure 4:
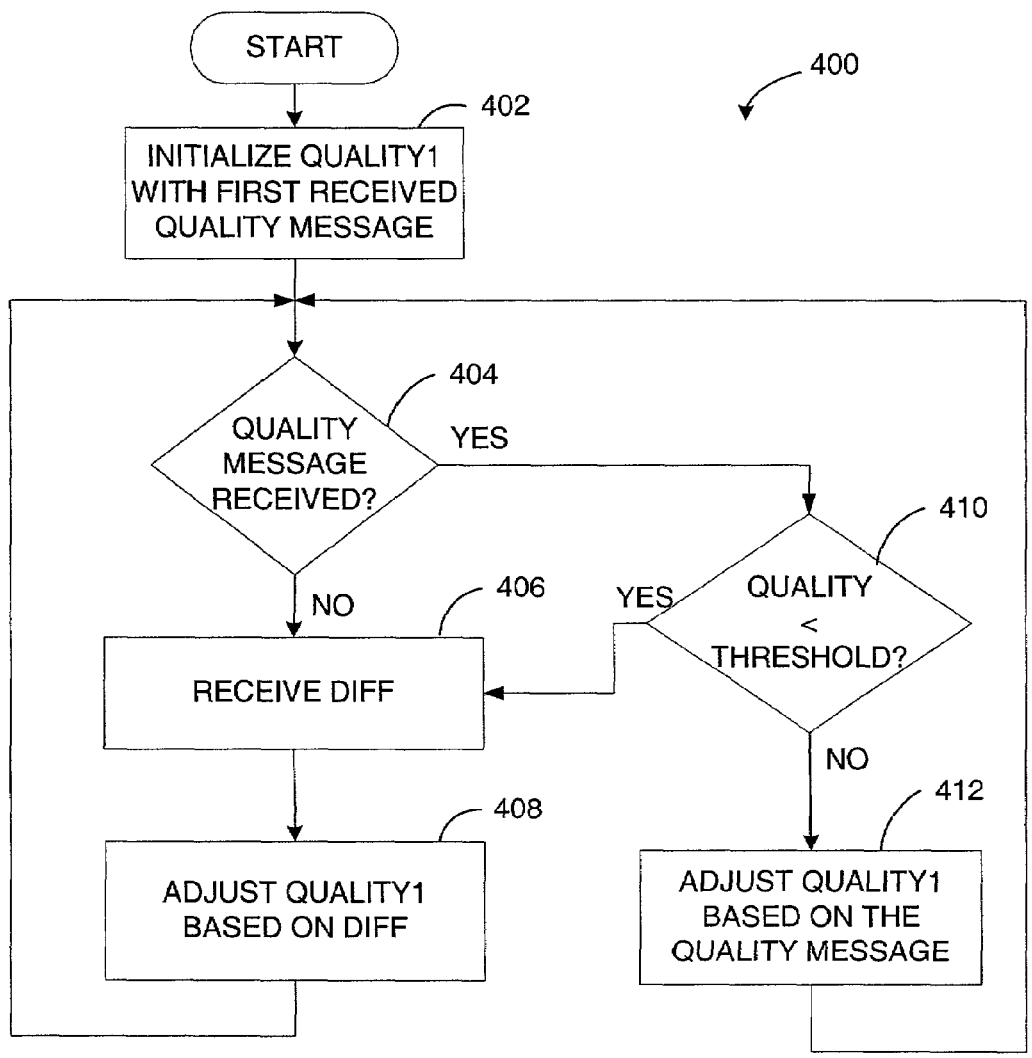
FIG. 4 is a flow diagram of a method of power control providing a differential indicator with a link quality message.

According to an exemplary embodiment, for forward link power control the DIFF value is transmitted with the quality message, providing the BS with two channel indicators. Similarly, for reverse link power control two indicators are provided to the MS or AT. The BS uses the information from one indicator to validate the information of the second indicator. The BS may also evaluate the quality message to determine the C/I value. If the C/I value is too low, e.g., below a threshold value, the BS may choose to ignore the quality message and act in response to the DIFF. As illustrated in FIG. 4, the method proceeds in a manner similar to method 350 of FIG. 3C. The method 400 processes quality messages and differential indicators at a base station. The variable "QUALITY1" is initialized to a default value at step 402 with the first received quality message. The default value may be based on an initially received quality message. The process then determines if a quality message is received at step 404. On receipt of a quality message, processing continues to decision diamond 410 to compare the quality message to a threshold. If the quality message is less than the threshold, processing continues to step 406, else the QUALITY1 is updated based on the quality message received at step 412. After adjustment, the process returns to step 404. When no quality message has been received at decision diamond 404 and a DIFF is received at step 406, the process continues to step 408 where QUALITY1 is adjusted based on DIFF. The process then returns to step 404.

In an alternate embodiment, when the quality message is transmitted, the corresponding DIFF value is used as a parity bit. The receiver calculates the quality message and then determines the polarity of the DIFF bit or bits. Therefore, the significance of the DIFF transmitted with the quality message does not have power control significance to indicate an up or down power control decision. The receiver identifies the DIFF transmitted with the quality message as a parity bit(s) and uses the DIFF to verify the accuracy of the quality message. The other DIFFs, i.e., DIFF not sent with quality message, have power control significance to indicate up or down power control decisions. If the receiver detects an error in the quality message, the receiver ignores the quality message and uses subsequent DIFF values for continued power control.

Still another embodiment transmits a constant value DIFF with each quality message. In this way, the DIFF transmitted with the quality message is not a differential value, but rather is used to enhance phase estimation. There is a symbol reserved for power control (punctured in pilot) and if this is not used for power control but sent as a constant symbol, the symbol may be used for pilot estimation. For example, in some systems no power control is needed on the RL, thus freeing up any bits allocated for RL power control.

The explicit C/I feedback information may be sent periodically or according to a predetermined schedule. Feedback information is sent from individual mobile units according to a distribution schedule. In this way, individual MSs or ATs are instructed to transmit the C/I feedback at different times. The distribution schedule is designed to maintain the mean number of feedback transmissions per slot approximately equal to the number of MSs using the channel divided by the number of slots between feedback transmissions.

As an example, for a BS in communication with multiple MSs, the BS may apply a schedule for each MS to transmit the quality message. In this way, different MSs use different timing to transmit the quality message. Staggering the transmissions results in a mean number of quality messages transmitted in a given slot that is approximately given by:

$$M = N/S_{MESSAGE}(\text{slots}) \quad (1)$$

Wherein N is the number of MSs using a given channel and $S_{MESSAGE}$ is the number of slots in $T_{MESSAGE}$ less the slot in which the quality message is sent. $T_{MESSAGE}$ is the time period between feedback quality messages.

According to one embodiment, the C/I feedback message identities the MS to determine the phasing of the explicit C/I feedback. Since a number of mobile units may have identities that result in the same phasing of the explicit C/I feedbacks, an alternate embodiment randomizes the locations of the explicit C/I feedbacks. The randomization may incorporate the long code, similar to transmission of power control groups as specified for the IS-95 reverse link. Note that for explicit transmission of C/I, such as the quality message, C/I value, or link message, the position of the information in a transmission may be randomized, e.g., the use of long PN code.

Figure 5:
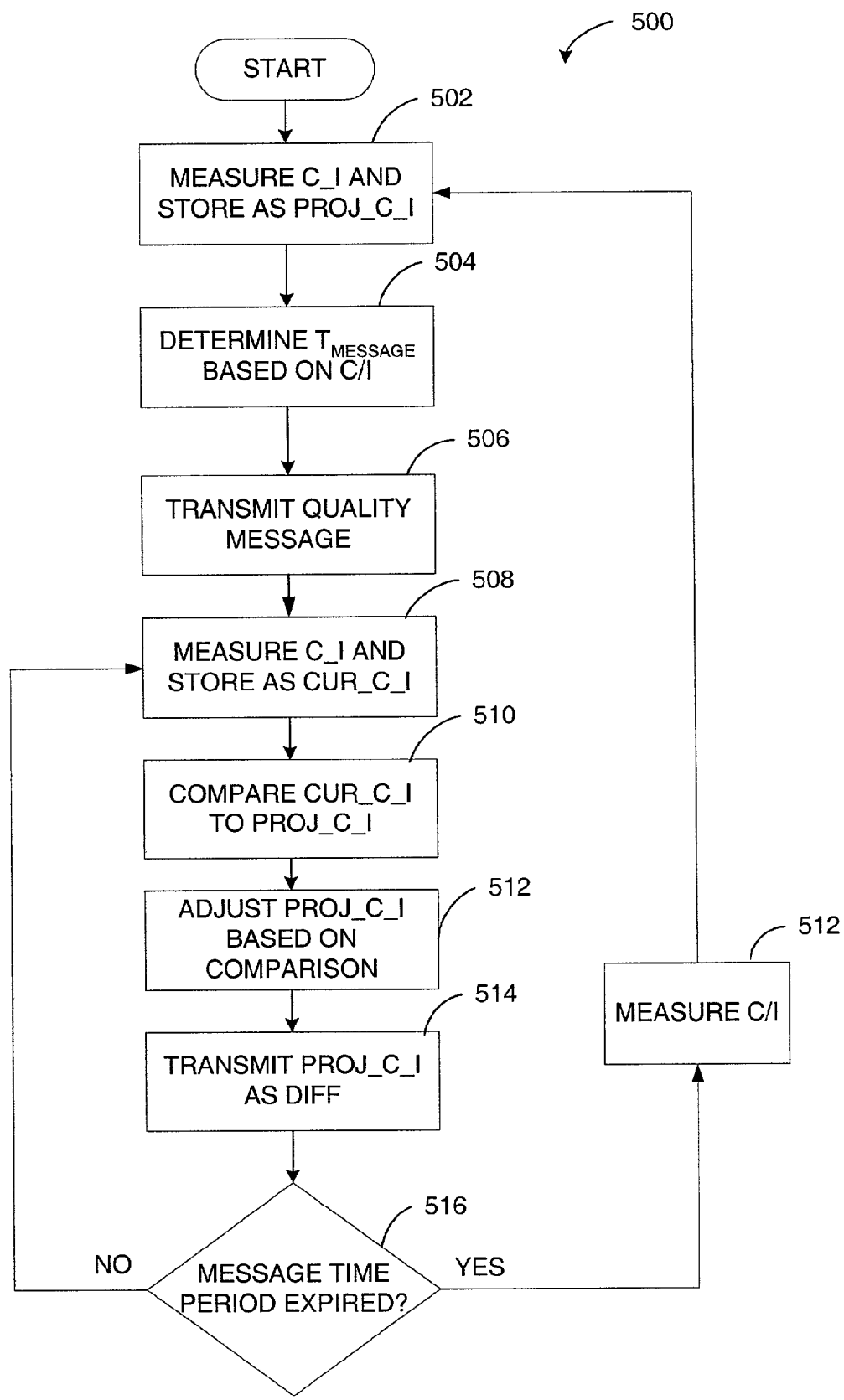
FIG. 5 is a flow diagram of a method for processing link quality feedback information.

FIG. 5 illustrates a method 500 for operation of a differential analyzer, such as differential analyzer 206, in a remote station according to one embodiment. The process starts by measuring C/I and storing the measured value as a projected measurement in a variable "proj_C_I" at step 502. Step 502 is an initialization step and is performed only once per session. At this point no historical C/I measurements are available for a comparison.

At step 504, a time period for providing quality messages as feedback information is determined based on the proj_C_I value. At step 506 a quality message is transmitted based on the proj_C_I value. At step 508 the C/I is measured and stored as a current C/I measurement in a variable "cur_C_I." At step 510 the differential analyzer 206 compares cur_C_I to proj_C_I and generates DIFF accordingly. Additionally, the variable proj_C_I is adjusted in accordance with the comparison at step 512. The adjustment tracks changes in the link quality and, therefore, if cur_C_I is greater than proj_C_I, the value proj_C_I is increased and vice versa. The differential indicator, DIFF, is transmitted at step 514, wherein DIFF has been determined by the comparison of cur_C_I and proj_C_I. Note that DIFF provides an indication of the direction of change in link quality. In one embodiment DIFF is a single bit, wherein a positive value corresponds to an increase and a negative value corresponds to a decrease. Alternate polarity schemes may be implemented as well as multiple bits to represent DIFF, which provides an indication of the amount of change in addition to the direction of the change.

At step 516, the process determines if the quality message time period, $T_{MESSAGE}$, has expired. Within each quality message time period one quality message is transmitted, while multiple differential indicators are transmitted. On expiration of the quality message time period, the process proceeds to step 512 to measure the C/I, and then return to step 504. If TMESSAGE has not expired at step 516, the process returns to step 508. In this way, the remote station provides a quality message with the full projected C/I information, i.e., proj_C_I, and successive differential indicators to track changes to the projected C/I. Note that in one embodiment, each differential indicator is assumed to correspond to a predetermined step size. In an alternate embodiment the differential indicator is assumed to correspond to one of several predetermined step sizes. In another embodiment the amplitude of the differential indicator determines the step size. In another embodiment the differential indicator includes multiple information bits, wherein the bits have significance to select the direction and amplitude of the step size among a set of predetermined step sizes. In yet another alternate embodiment, the step size may change dynamically.

As described hereinabove, transmission slots may be employed to provide quality message feedback explicitly. The quality messages may be sent according to a predetermined schedule or may be transmitted according to a schedule that is dynamically adjusted in response to operation of the system. According to one approach, the rate of sending the explicit quality message feedback is varied based on system operation, wherein quality messages are sent more frequently during times of anticipated reception. For example, the MS or remote station may anticipate or estimate receipt of transmissions from a BS during a given period of time or window. The MS estimates the variation in C/I, or other quality measurement, over some time window. If the current C/I is above a designated threshold, the MS sends the explicit C/I more frequently. If the current C/I is below a designated threshold, the MS sends the explicit C/I less frequently. Note that the time window also may be dynamically adjusted.

As an example, let CI[k] be the C/I ratio measured for slot k, wherein the CI[k] is the C/I ratio that is to be transmitted on the reverse link during slot k. From the value CI[k], determine $\overline{CI}[k]$ and VarCI[k], as defined in Equations (2) and (3). According to one embodiment, the Equations (2) and (3) describe Infinite Impulse Response (IIR) filters used to for the calculations.

$$\overline{CI}[k] = \alpha CI[k] + (1-\alpha)\overline{CI}[k-1] \qquad (2)$$

$$VarCI[k] = \alpha(CI[k] - \overline{CI}[k])^2 + (1-\alpha)VarCI[k-1] \qquad (3)$$

Additionally, calculate the following:

$$\Delta T[k] = \sqrt{VarCI[k]} \qquad (4)$$

$$Thigh[k] = Tbase + \beta_{high}\Delta T[k] \qquad (5)$$

$$Tlow[k] = Tbase - \beta_{low}\Delta T[k] \qquad (6)$$

$$Thres[k] = \overline{CI}[k] + \gamma \qquad (7)$$

wherein Thigh[k] and Tlow[k] are the high and low intervals of transmitting the explicit C/I feedback information. If CI[k] is greater than Thres[k], then Tlow[k] is used, if CI[k] is less than Thres[k], then Thigh[k] is used. As used in Equations (5), (6), and (7), $\alpha$, $\beta_{high}$, $\beta_{low}$, and $\gamma$ are constants. Note that the present embodiment is provided as an illustrative method. Alternate embodiments may employ any of a variety of methods of dynamically changing and determining how to transmit quality message feedback information.

Figure 6:
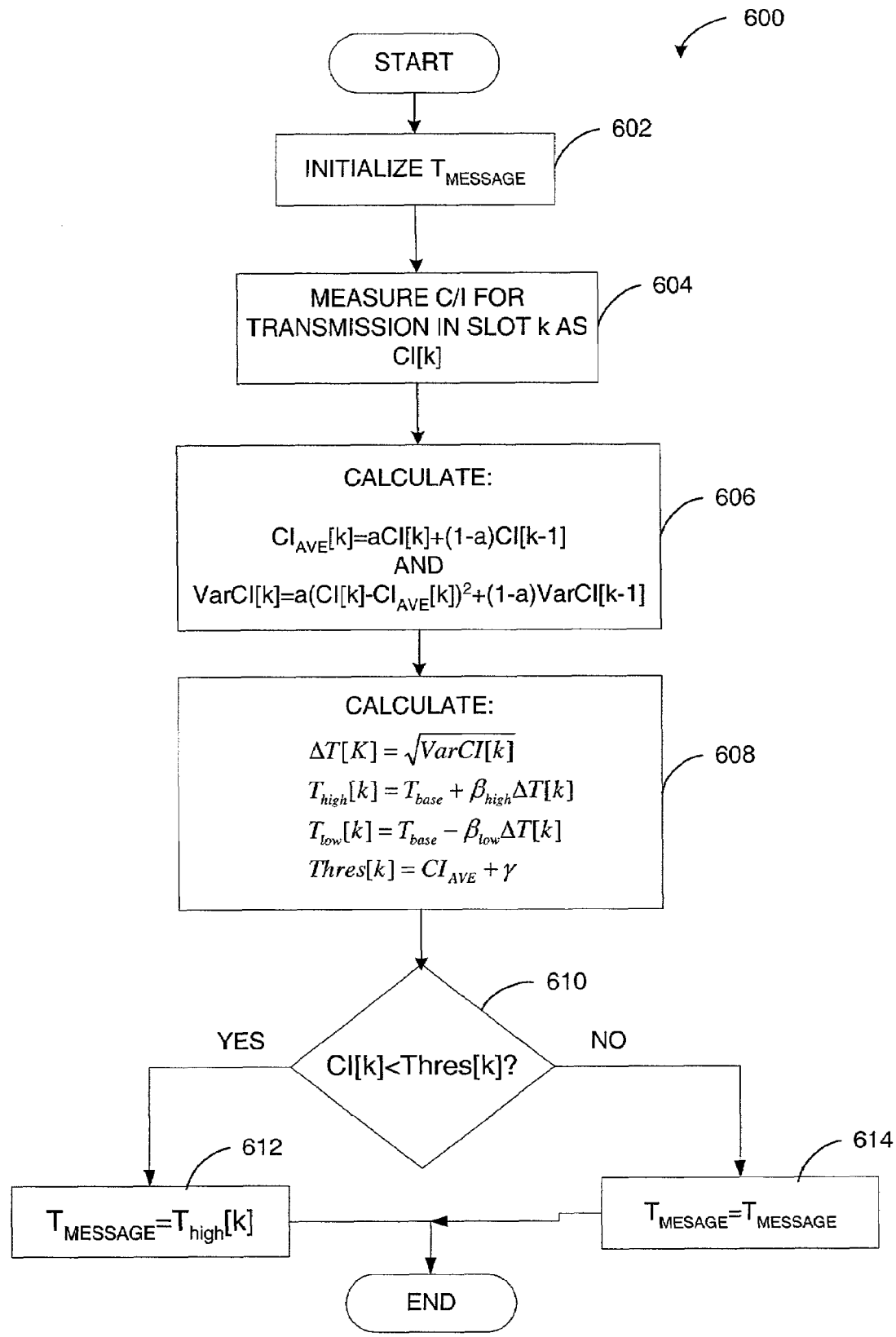
FIG. 6 is a flow diagram of a method for sending a link quality message.

FIG. 6 illustrates one embodiment for determining $T_{MESSAGE}$, as described above with respect to Equations (2) through (7). The method 600 starts by initializing $T_{MESSAGE}$ at step 602. The initial value may be a predetermined value, a fixed value, or a function of previous $T_{MESSAGE}$ values. At step 604 the C/I is measured for transmission during slot k. The measured C/I value is stored as CI[k] and used for calculation of an average C/I value as well as a variance value at step 606. The average C/I is calculated as given in Equation (2) and the variance as in Equation (3). At step 608 the average C/I and variance are used to calculate thresholds and intermediate values for adjustment of $T_{MESSAGE}$. In this way, each C/I measured value is compared to a threshold. $T_{base}$ is the baseline C/I feedback rate (for example, 10 ms). $T_{high}$ and $T_{low}$ refer to upper and lower time periods provided between C/I updates; wherein $T_{low}$ is applied when above the threshold, and $T_{high}$ is applied when below the threshold. At step 610 the measured value CI[k] is then compared to the threshold value Thresh[k]. When CI[k] is less than Thresh[k], the process continues to step 612 to set $T_{MESSAGE}$ equal to Thigh, as calculated in step 608. The value Thigh increases the quality message period, as the channel quality indicates insufficient resources for reception. Else, from step 612, if CI[k] is greater than or equal to Thresh[k], processing continues to step 614, wherein $T_{MESSAGE}$ is maintained at its current value.

Several embodiments described hereinabove illustrate the use of an explicit quality message feedback. Note that in some embodiments, transmission of the explicit feedback added to transmission of the pilot results in a transmission load similar to that for transmission of a voice call. Even reduction of the quality message to less bits, such as to a 1-bit differential feedback, may still result in a relatively high load as the pilot is continually transmitted. An alternate embodiment uses Discontinuous Transmission mode, referred to as DTX, to reduce the loading incurred by the quality message feedback. For example, in one embodiment, when $\Delta T[k]$ of Equation (4) is greater than a designated value, the MS transmits quality messages during each slot for which the CI[k] is less then Thres[k]. When $\Delta T[k]$ is less than the designated value, the MS transmits periodically or according to a predetermined schedule. According to this embodiment, when the MS first transmits a quality message, the MS initializes quality message transmission, by transmitting the explicit C/I for a few slots. Following initialization, the MS transmits the differential C/I or DIFF value.

Basically, the MS does not transmit quality messages when C/I is low, or when the MS does not anticipate reception from the BS. When the C/I is slow varying, such as when the fade rate is high, the MS periodically transmits the quality message. The MS begins by sending the explicit quality message, such as C/I information, and then uses the differential up-down feedback to continue power control instructions. In this way, when the fade rate is high, all slots are effectively the same condition and therefore so long as the MS transmits feedback of some king, i.e., at least sometimes, the BS will schedule transmissions to the MS at some point. Note also, that it may be beneficial for the MS to adjust the transmission rate for the quality messages based upon the amount of received traffic, wherein for active transmissions from the BS the MS transmits quality messages more often.

Figure 7:
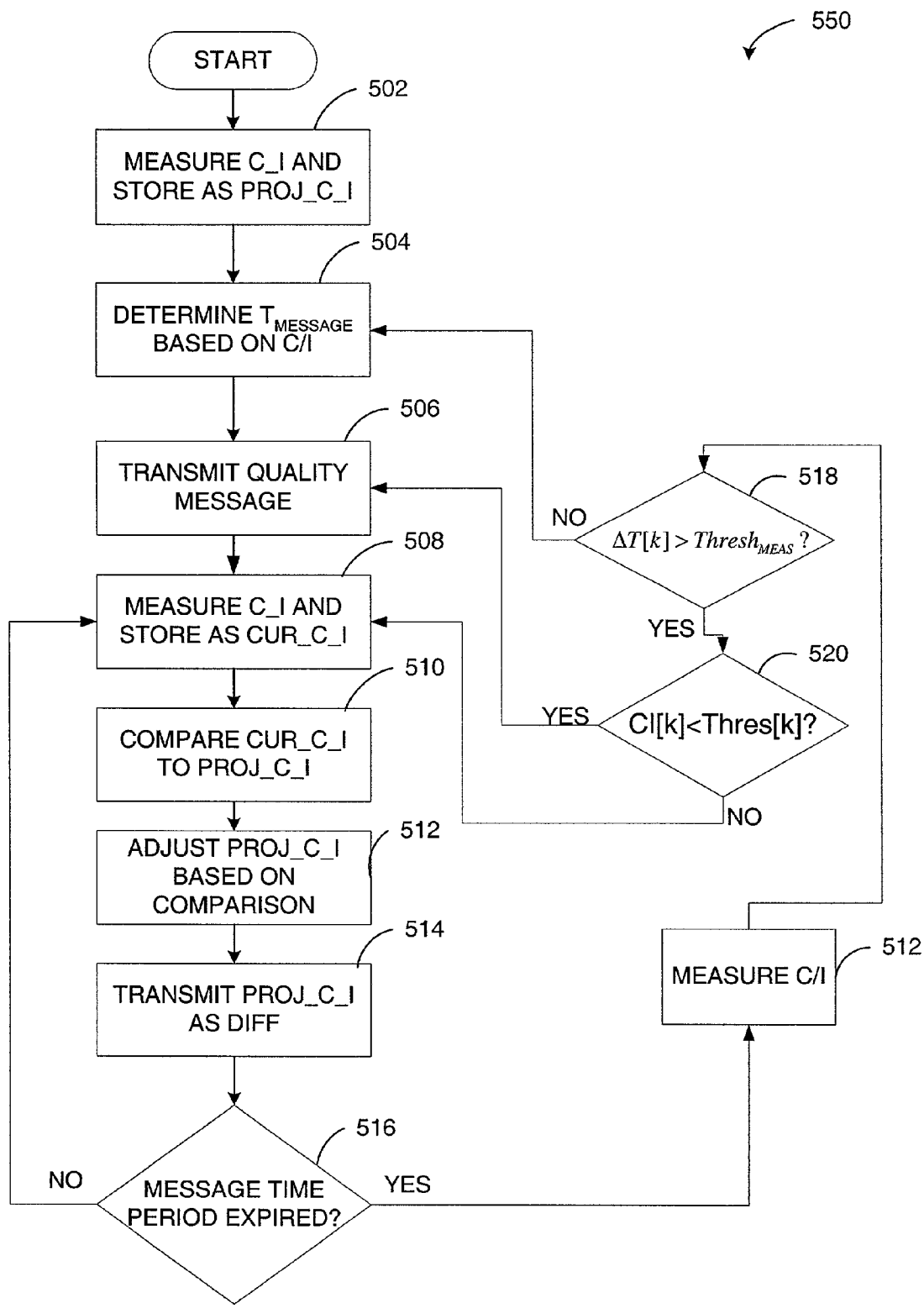
FIG. 7 is a flow diagram of a method for processing link quality feedback information.

FIG. 7 illustrates one embodiment of dynamic adjustment of the quality message transmission rate as described hereinabove. The method 550 is a modification of the method 500 illustrated in FIG. 5. Specifically, from step 512 the method 550 includes a decision diamond 518 to determine if $\Delta T[k]$ from Equation (4) is greater than a designate threshold, $Thresh_{meas}$. When $\Delta T[k]$ is greater than $Thresh_{meas}$, i.e., the MS anticipates reception, processing continues to step 520 to compare CI[k] to Thresh[k]. When CI[k] is less than Thresh[k], processing continues to step 508; else processing continues to step 510. If $\Delta T[k]$ is not greater than $Thresh_{meas}$ at step 518, i.e., the MS does not anticipate reception, processing returns to step 504.

The quality message feedback methods described hereinabove may also be extended to multi-carrier operation. Multi-carrier may be designed to operate in any of several different ways. In one system, code symbols are distributed across all carriers resulting in frequency diversity (or a form of transmit diversity) when different frequencies are radiated from different antennas. In this system, the C/I measurements are made on all carriers and the mean C/I (or some weighting thereof) is used as the C/I in the feedback. The above-described techniques are applicable to such a system. In one embodiment, a weighted average among carriers is used as feedback.

An alternate system transmits independently from each antenna. In this system, the MS chooses the frequency having the best channel condition, or C/I, and transmits the explicit quality message feedback along with an indication of the frequency. For example, when three frequencies are in use, the explicit feedback from the MS may consist of a 2 bit (3-value) pointer to the best frequency along with a 5-bit C/I value. The above-described techniques are applicable to such a system.

Note that since channel quality, e.g. C/I, differences between carriers are likely to be great, every time that the MS decides to indicate that a new carrier is preferable, it uses an explicit C/I feedback including the identification of the best carrier. Once it has transmitted the explicit C/I feedback for at least one slot (it may be preferable to transmit it for a couple of slots to make sure that the BS has received it), then the MS can transmit the differential up-down feedback. Similarly, after not transmitting on the RL for a while, the MS transmits the explicit C/I feedback along with the 2-bit pointer to the best frequency.

As described hereinabove, the use of a quality message for providing channel quality information from the receiver to transmitter is dynamically adjusted according to the requirements and/or operation of a given system. The quality message may be sent periodically to reduce the reverse link loading. In an alternative embodiment, the receiver determines when transmissions are anticipated and sends the quality message in response. At other times, the receiver does not provide the quality message. The various aspects and embodiments enhance the various methods and mechanisms associated with transmission of quality messages.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. In a wireless communication system, a method comprising:
    estimating a channel condition over a first time window including calculating an average channel condition and a variance channel condition;
    comparing the estimated channel condition to a first threshold value;
    determining a first transmission rate for transmission of quality messages and a second transmission rate for transmission of differential indicators based on the comparison;
    transmitting quality messages at the first transmission rate; and
    transmitting differential indicators independently of quality messages at the second transmission rate, wherein the second transmission rate is greater than the first transmission rate.

2. The method as in claim 1, wherein the first time window is dynamically adjusted based on operation of the system.

3. A wireless apparatus, comprising:
    means for estimating a channel condition over a first time window including calculating an average channel condition and a variance channel condition;

means for comparing the estimated channel condition to a first threshold value;

means for determining a first transmission rate for transmission of quality messages and a second transmission rate for transmission of differential indicators based on the comparison;

means for transmitting quality messages at the first transmission rate; and means for transmitting differential indicators independently of quality messages at the second transmission rate, wherein the second transmission rate is greater than the first transmission rate.

4. A wireless apparatus, comprising:

processing unit, operative for executing computer-readable instructions; and a memory storage unit storing a plurality of computer-readable instructions for:
  generating quality messages at a first frequency and differential indicators at a second frequency, the quality messages providing information on the quality of a communication link, wherein the differential indicators track a quality metric between successive quality messages and wherein the second frequency is greater than the first frequency;
  generating a parity check for each of the quality messages; and
  transmitting the quality messages at the first frequency and differential indicators at the second frequency.

5. A wireless apparatus, comprising:

processing unit, operative for executing computer-readable instructions; and a memory storage unit adapted to store a plurality of computer-readable instructions for:
  estimating a channel condition over a first time window including calculating an average channel condition and a variance channel condition;
  comparing the estimated channel condition to a first threshold value;
  determining a first transmission rate for transmission of quality messages and a second transmission rate for transmission of differential indicators based on the comparison;
  transmitting quality messages at the first transmission rate; and
  transmitting differential indicators at the second transmission rate independently of quality messages, wherein the second transmission rate is greater than the first transmission rate.

6. In a wireless communication system, the wireless communication system supporting a plurality of carriers, a method comprising:
  determining an average channel condition among the plurality of carriers including calculating an average channel condition and a variance channel condition;
  comparing the average channel condition to a first threshold value;
  determining a first transmission rate for transmission of quality messages and a second transmission rate for the transmission of differential indicators based on the comparison;
  transmitting quality messages at the first transmission rate; and
  transmitting differential indicators at the second transmission rate independently of quality messages, wherein the second transmission rate is greater than the first transmission rate.

7. The method as in claim 6, farther comprising:
  assigning a weight to each of the plurality of carriers, wherein the average channel condition is a weighted average.

8. A wireless apparatus, comprising:

processing unit, operative for executing computer-readable instructions; and a memory storage unit storing a plurality of computer-readable instructions for:
  determining a best channel condition associated with a first frequency; and
  generating a quality message, the quality message including a quality indicator and a frequency indicator, the frequency indicator identifying the first frequency; and
  generating differential indicators separately from the quality message.

9. A wireless apparatus, comprising:
  a quality measurement unit configured to estimate a channel condition over a first time window including calculating an average channel condition and a variance channel condition;
  a differential analyzer configured to compare the estimated channel condition to a first threshold value; and
  a controller configured to determine a first transmission rate for transmission of quality messages and a second transmission rate for transmission of differential indicators based on the comparison, the differential analyzer further configured to generate quality messages at the first transmission rate, the differential analyzer further configured to transmit differential indicators at the second transmission rate independently of quality messages, wherein the second transmission rate is greater than the first transmission rate.

10. The wireless apparatus of claim 9, wherein the first time window is dynamically adjusted based on operation of the system.

11. The wireless apparatus of claim 3, further comprising:
  means for dynamically adjusting the first window based on operation of the system.

12. A non-transitory storage medium having stored thereon processor-executable software instructions configured to cause a processor to perform steps comprising:
  estimating a channel condition over a first time window on a system including calculating an average channel condition and a variance channel condition;
  comparing the estimated channel condition to a first threshold value;
  determining a first transmission rate for transmission of quality messages and a second transmission rate for transmission of differential indicators based on the comparison;
  transmitting quality messages at the first transmission rate; and
  transmitting differential indictors at the second transmission rate independently of quality messages, wherein the second transmission rate is greater than the first transmission rate.

13. The non-transitory storage medium of claim 12, wherein the tangible storage medium has stored thereon processor-executable software instructions configured to cause a processor to perform further steps comprising dynamically adjusting the first time window based on operation of the system.

14. In a wireless communication system, a method comprising:
- estimating a channel condition over a first time window including calculating an average channel condition and a variance channel condition;
- comparing the estimated channel condition to a first threshold value;
- determining a transmission rate for transmission of quality messages based on the comparison;
- transmitting quality messages at the transmission rate;
- wherein quality messages are generated at a first frequency, the quality messages providing information on the quality of a communication link, a parity check is generated for each of the quality messages, and, differential indicators are generated at a second frequency, the differential indicators indicating changes in the quality of the communication link, wherein the second frequency is greater than the first frequency.

15. The method of claim 14, wherein each quality message includes carrier to interference information of a received signal at a receiver.

16. The method of claim 14, wherein each differential indicator is at least one bit.

17. The method of claim 14, wherein the quality messages are transmitted via a gated channel.

18. The method of claim 14, wherein the differential indicators are transmitted via a continuous channel.

19. The method of claim 14, wherein the first time window is dynamically adjusted based on operation of the system.

20. The, method of claim 14, comprising:
- determining an average channel condition among a plurality of carriers;
- comparing the average channel condition to a first threshold value;
- determining a transmission rate for transmission of quality messages based on the comparison; and
- transmitting quality messages at the transmission rate.

21. The method of claim 20, further comprising:
- assigning a weight to each of the plurality of carriers, wherein the average channel condition is a weighted average.

22. A remote station apparatus comprising:
- means for estimating a channel condition over a first time window;
- means for comparing the estimated channel condition to a first threshold value;
- means for determining a transmission rate for transmission of quality messages based on the comparison;
- means for transmitting quality messages at the transmission rate;
- means for iteratively measuring link quality of a communications link;
- means for generating a quality message at a first frequency based on the measured link quality and for generating a parity check corresponding to the quality message; and
- means for determining changes in the measured link quality and for generating differential indicators at a second frequency, the differential indicators indicating changes in the quality of the communication link, wherein the second frequency is greater than the first frequency.

23. The remote station of claim 22, wherein the link quality is measured as carrier to interference of a received signal.

24. A base station comprising:
- receive circuitry operative to receive signals on a reverse link of a wireless communication system for processing voice communications and packet-switched communications, the signals including a quality message with a parity check at a first rate, and differential indicators at a second rate; the quality message periodically providing a quality metric of a forward link; wherein the differential indicators track the quality metric between successive quality messages and wherein the second rate is greater than the first rate;
- a memory storage unit operative to store a quality message received on the reverse link; and
- a differential, analyzer to update the quality message stored in the memory storage unit in response to the differential indicators and the parity check.

* * * * *